Sept. 11, 1962 G. W. COOK 3,054,053
PASSIVE DETECTION AND WAVE ANALYZER SYSTEM
Filed Feb. 20, 1958 4 Sheets-Sheet 1

Inventor:
George W. Cook
By Leo Wilder
Attorney

Inventor:
George W. Cook
Attorney

Inventor:
George W. Cook
By Leo Wilder
Attorney

United States Patent Office 3,054,053
Patented Sept. 11, 1962

3,054,053
PASSIVE DETECTION AND WAVE ANALYZER SYSTEM
George W. Cook, Washington, D.C., assignor to Reed Research Inc., Washington, D.C., a corporation of Delaware
Filed Feb. 20, 1958, Ser. No. 716,473
7 Claims. (Cl. 324—77)

This invention relates to detection systems, and more particularly to passive detection systems having very high selectivity.

The role of submarines in modern warfare is constantly being extended, particularly under the impetus of truly submersible types such as the nuclear powered submarines. The designers and operators of these submarines are making headway in their attempt to lower the level of acoustic energy radiated from them, and therefore the current methods of acoustical detection are becoming increasingly obsolete.

Present acoustical detection systems attempt to filter out all frequencies other than a single frequency conveying useful information. But, the tuned circuits necessarily employed in filter circuits can be shock excited by any sharp waveform (e.g. soniferous marine life, waves, wind, marine traffic) containing frequency components higher than the frequency to which the circuits are tuned. These spurious signals cause "ringing" at the tuned frequency of the filters, and indicate inaccurate information about undersea sounds.

Careful design can lower these unwanted filter responses to very low levels, but "ringing" will always exist to some degree, as long as tuned circuits are employed, and limit the signal to noise ratio below which filters cannot be utilized effectively.

The invention contemplates a detection system which is not subject to the disadvantages associated with filter circuits, for it does not use any filters or other tuned circuits. The input detected from the submarine is compared with a search signal in an eight legged bridge and the difference frequency is produced by phase detectors in response to the bridge. The output of one phase detector is 180° out of phase with the output of the other, and both are used to modulate two square wave carriers 90° out of phase in two modulators. The modulator outputs are combined in a circuit tuned to the carrier frequency at an amplitude proportional to the original input amplitude.

The two phase detectors are so constructed and arranged as to permit very high selectivity by recognizing only a very low difference frequency. This determines the bandwidth of frequencies detected which may be made as narrow as desired providing a very high effective Q. A bandwidth of 0.5 cycle per second at 20 kc., for example, corresponds to an effective Q of about 40,000 or about 100 times that attainable with the best tuned circuits.

Accordingly, it is an object of the invention to provide a detection system which may be made as selective as necessary.

It is another object of the invention to provide a detection system which is not responsive to random noise.

These and other objects and advantages of the invention will be brought out more fully in the following description of an illustrative embodiment thereof, when considered in connection with the accompanying drawings in which.

Figure 1:
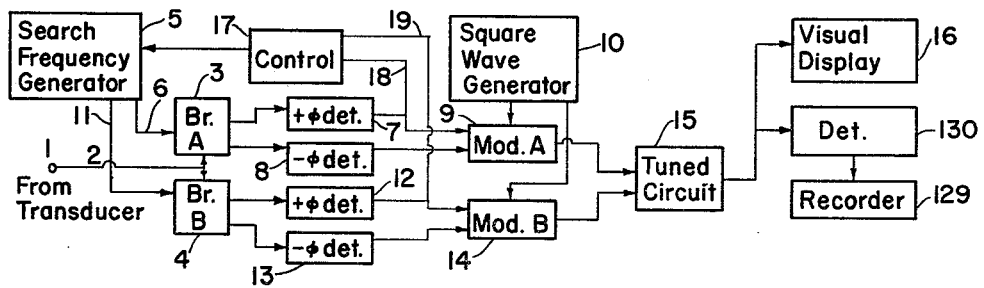
FIG. 1 is a functional block diagram of a passive detection system constructed in accordance with the invention.

Referring now to FIG. 1, there is shown a functional block diagram of a passive detection system constructed in accordance with the invention. Terminal 1 is the input to the system from an undersea transducer or hydrophone. It is fed to two bridges, 3 and 4, over line 2. Search frequency generator 5 generates a frequency which is fed into another terminal of bridge 3 over line 6. The bridge compares the frequency of generator 5 with that fed from the transducer over input 1, and delivers an indication of the difference in frequency to positive phase detector 7 and negative phase detector 8.

The outputs of the two phase detectors 7 and 8 are a.c. wave forms 180° out of phase and of a frequency equal to the difference in frequency between the two frequencies compared in bridge 6. These outputs are fed to modulator 9, where they are combined in push-pull to modulate a square wave from square wave generator 10.

Search frequency generator 5 also feeds the search frequency to bridge 4, but this input is 90° out of phase with that presented to bridge 3. The positive and negative phase is detected in phase detectors 12 and 13, and then fed to modulator 14 in the same manner as described above for the other half of the system. Square wave generator 10 also furnishes an output to modulator 14, but this square wave is 90° out of phase with that presented to modulator 9.

The outputs of modulators 9 and 14 are 90° out of phase and of frequency equal to the difference in frequency between the two input frequencies presented to each of the bridges 3 and 4; and the contents of the envelopes being square waves, 90° out of phase.

These outputs are combined in a circuit 15, tuned to the square wave generator frequency, which produces a sine wave at the square wave frequency of an amplitude proportional to the amplitude of the input from the transducer. This voltage is fed to a visual display device 16 which may be a voltmeter. This gives a visual indication of the amplitude of the incoming signal from the transducer, and serves to indicate the direction of maximum signal when the transducer is rotated.

The frequency of the search frequency generator 5 is controlled by control means 17 which is responsive to the output of the positive phase detectors 7 and 12 over lines 18 and 19 respectively. As will be more fully described hereinafter, when the two frequencies fed into the bridges are identical, and in phase in bridge 3, the output of phase detector 7 will be a positive D.C. potential, and the output of phase detector 12 will be zero. If the input frequency then changes, phase detector 12 will present either a positive or negative D.C. potential which, fed to control means 17, determines the proper sign of the change in frequency of search frequency generator 5. Thus, once the input frequency is "found," the system latches on so that it cannot be lost, even though the submarine generating the frequency changes its speed.

The high selectivity and effective Q of the system is realized by restricting the band width of the difference frequency which may be indicated by the phase detectors. This is made variable by providing a variable condenser in each of the phase detectors, as will be more fully described hereinafter.

Figure 2:
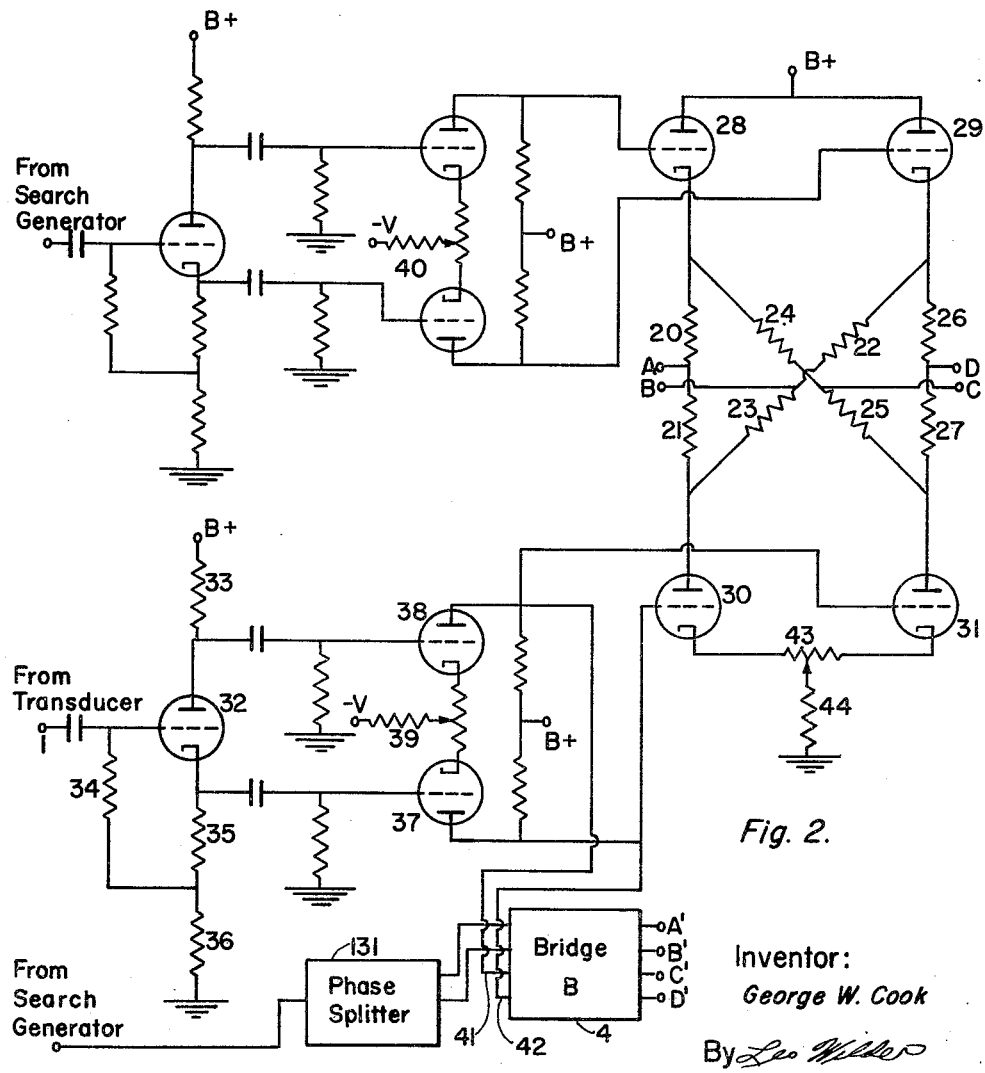
FIG. 2 is a schematic diagram of a bridge used in the system illustrated in FIG. 1.

Referring now to FIG. 2, there is shown a schematic diagram of bridge 3, shown in functional form in FIG. 1. The bridge proper comprises the resistors 20, 21, 22, 23, 24, 25, 26, and 27 combined in an eight-legged bridge fed from triodes 28 and 29 which introduce the search frequency, and triodes 30 and 31 which introduce the input frequency.

The input frequency arrives at terminal 1 and is fed into a conventional phase splitter comprising triode 32, plate resistor 33, grid resistor 34, cathode resistor 35, and bias resistor 36. The output from the cathode, in phase with the input frequency, is fed to triode 37, and the other output from the plate, 180° out of phase with the input frequency, is fed to triode 38.

Triodes 37 and 38 are connected in push-pull, with the cathodes negatively biased, to provide for exact equalizing of each output wave form, by proper centering of variable resistor 39. The outputs, 180° out of phase with each other to the bridge, are fed to the grids of triodes 30 and 31.

The input to the bridge from the search frequency generator is manipulated in the same way, equalization being produced by variable resistor 40.

The equalized wave form of the input frequency is fed to both bridges of the system, and as both bridges are identical, only the terminals 41 and 42, leading to the other bridge, are shown specifically.

In the bridge, resistor 43 and variable tap 44 to ground are used to establish a ground potential in reference to the input frequency and to equalize the potentials that occur at the plates of triodes 30 and 31 when each is conducting.

The push-pull amplifiers are arranged to produce the same potential on all four outputs when no input signals are received. The outputs of the two amplifiers oscillate about this potential so as to produce a constant current condition in the bridge.

In operation, the four triodes 28, 29, 30 and 31 of the bridge are current regulators, controlling the flow through the eight equal resistors of the bridge—20, 21, 22, 23, 24, 25, 26 and 27. The current input to the bridge is constant, and so is the current output. This is so, for when one tube of a pair of triodes is conducting more current, the other is conducting proportionally less current, because of the push-pull circuit which determines the relation of grid potentials between the two tubes. The distribution of currents in the resistor network, however, is dependent on the difference in phase between the potentials of the grids of the input tubes and the potentials of the grids of the output tubes. The four outputs from the bridge are taken from taps A, B, C, and D at the junctions of the several resistors 20 and 21, 22 and 23, 24 and 25, and 26 and 27 respectively.

Figure 3:
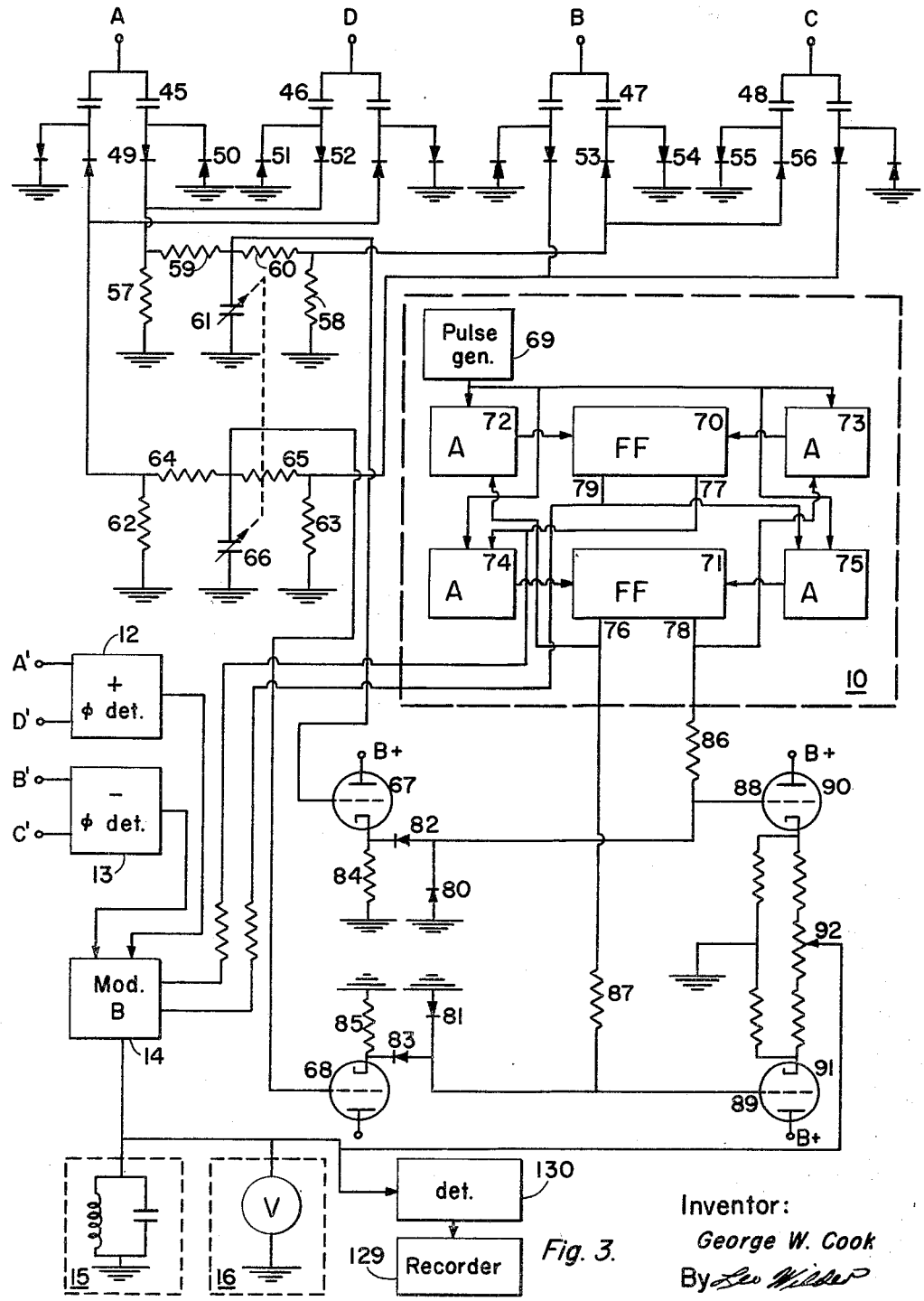
FIG. 3 is a schematic diagram of the phase detectors, modulators, tuned circuit, and visual display device used in the system of FIG. 1.

Referring now to FIG. 3, there is illustrated in schematic form the rest of the system, having as input potentials from terminals A, B, C and D. The inputs from A and D feed through two differentiating capacitors 45 and 46, and the positive going excursions of the wave forms are then combined in differentiating resistor 57 via diodes 49 and 52 after the negative going excursions are clipped by diodes 50 and 51. The voltage across resistor 57 is the composite of the positive going derivatives of the wave forms presented at terminals A and D.

Similarly, the voltage across resistor 58 is the composite of the negative going derivatives of the wave forms presented at terminals B and C. This is accomplished by differentiating the wave forms in capacitors 47 and 48, clipping the positive going excursions with diodes 54 and 55, and passing the negative going excursions through diodes 53 and 56 to resistor 58. Thus the voltage drop across resistor 58 may be only negative with respect to ground. A voltage divider comprising equal resistors 59 and 60 is connected between these two resistors, and the capacitor connected between their junction and ground is charged to the mean value of the two voltage drops across resistors 57 and 58.

The value of capacitance of condenser 61 is variable, and therefore, by adjusting the capacitance to be very large, the reactance presented to high frequencies is very small and only low frequencies appear across the capacitor. If the capacitance is made sufficiently large, the highest frequency which can appear across the capacitor may be a fractional number of cycles per second. This is how an extremely large effective Q is attained, with a consequent reduction of reception of unwanted signals outside the narrow bandpass. It is to be noted that the bandpass is not dependent upon the operating frequency, but is always exactly the same width, thus the "Q" of the system increases proportionally with frequency.

*Example 1*

Referring again to FIG. 2, if no input frequency is received from the transducer over input 1, the triodes 30 and 31 will remain in an intermediate state of conduction, each tube conducting the same amount of current. The current flow through triodes 28 and 29, however, will be a sine wave at the search frequency. There will be a time in each cycle in which triode 28 is in its state of maximum conduction and triode 29 is in its state of minimum conduction. Then most of the current flow through the bridge (using the convention of current flow opposite in direction from electron flow) is through resistors 20 and 21 to the plate of triode 30, and through resistors 24 and 25 to the plate of triode 31. Since triodes 30 and 31 are equally conducting and since all resistors in the bridge are equal, the current in both paths will be equal. Therefore, equal potentials appear at points A and C, between resistors 20 and 21, and between resistors 24 and 25 respectively. Similarly, equal potentials appear at points B and D, though they are somewhat less in magnitude than those at A and C.

One half cycle later, the relative conduction of triodes 28 and 29 is reversed, triode 28 being at its state of minimum conduction and triode 29 being at its maximum conduction, the conduction of triodes 30 and 31 remaining equal. Here again, the potentials A and C are equal and the potentials at B and D are equal, though now the magnitude of the potential at B and D is somewhat larger than that at A and C.

Halfway between the two points in the cycle discussed above, triodes 28 and 29 are in a state of equal conduction. When this occurs, the potentials appearing at A, B, C and D are all equal.

Thus, the amplitudes of the potentials at points A and C are equal, and the frequency is in phase with the search frequency; and the amplitudes of the potentials at points B and D are equal, and the frequency is 180° out of phase with the wave form at terminal A is said to represent sin ωt, then B is —sin ωt, C is sin ωt and D is —sin ωt. After differentiation these wave forms are transferred to cos ωt, —cos ωt, cos ωt, and —cos ωt respectively. The positive going excursions of the A and D wave forms are combined in resistor 57, the negative going excursions being shorted to ground via diodes 50 and 51. Thus the wave form across resistor 57 consists of the positive halves of two cosine waves, 180° out of phase with each other, which is a pulsating D.C. potential. At the same time, the negative halves of two cosine waves, 180° out of phase with each other, appear across resistor 58. Thus, the junction of resistors 59 and 60 remains at zero, since resistor 58 is negative the same amount the resistor 57 is positive, and no net charge is transferred to capacitor 61. For zero input, therefore, capacitor 61 registers zero charge.

*Example 2*

If now a waveform appears at input terminal 1 of FIG.

2, which is in phase with the search frequency, there will be a time each cycle when triodes 28 and 30 are at maximum conduction while triodes 29 and 31 are at minimum conduction. At this time the potentials at points A and D of the bridge will be equal, point C will be at a higher potential, and point B will be at a lower potential.

One-half cycle later, triodes 28 and 30 will be at minimum conduction and triodes 29 and 31 will be at maximum conduction. At this time, points A and D will again be at equal potential, point B will be at a higher potential, and point C will be at a lower potential. Thus, when the two frequencies are equal and in phase, points A and D remain equal through the entire cycle, and using the potential of A and D as a reference, B and C oscillate at the same frequency, but 180° out of phase with each other. Thus, at points A and D, the amplitude of oscillation, if any, is much less than that of points C and D.

Referring again to FIG. 3, it will be appreciated that the negative voltage across resistor 58, which is again a pulsating D.C. potential, is much larger than the positive voltage across resistor 57. Thus, capacitor 61 is charged negatively to a value porportional to the product of the peak amplitudes of the two frequencies.

*Example 3*

By the same process, it can be shown that the resultant charge on capacitor 61 when the two frequencies are at the same frequency and 180° out of phase is positive and of the same value as the negative charge when the two frequencies are in phase.

*Example 4*

If the two input frequencies are equal but 90° out of phase, a different result is achieved. At four points in each cycle, $$0, \frac{\pi}{2}, \pi, \text{ and } \frac{3\pi}{2}$$

the instantaneous value of one or the other frequencies will be zero, and the charge on the capacitor 61, should then be zero, in accordance with Example 1. At two points in each cycle, $$\frac{3\pi}{4} \text{ and } \frac{7\pi}{4}$$

the instantaneous amplitudes of the two frequencies will be equal and in phase, and thus the charge on capacitor 61 should be peak negative, in accordance with Example 2, and at two other points in each cycle $$\frac{\pi}{4} \text{ and } \frac{5\pi}{4}$$

the instantaneous amplitudes of the two frequencies will be equal and opposite, and thus the charge on capacitor 61 should be peak positive, in accordance with Example 3. Therefore, the potential of the junction of resistors 59 and 60 (FIG. 3), is a sine wave of frequency equal to twice the input frequency. But, capacitor 61 is large, and the network associated with capacitor 61 has a large time constant; therefore, the voltage registered across capacitor 61 will again be zero.

*Example 5*

Figure 6:
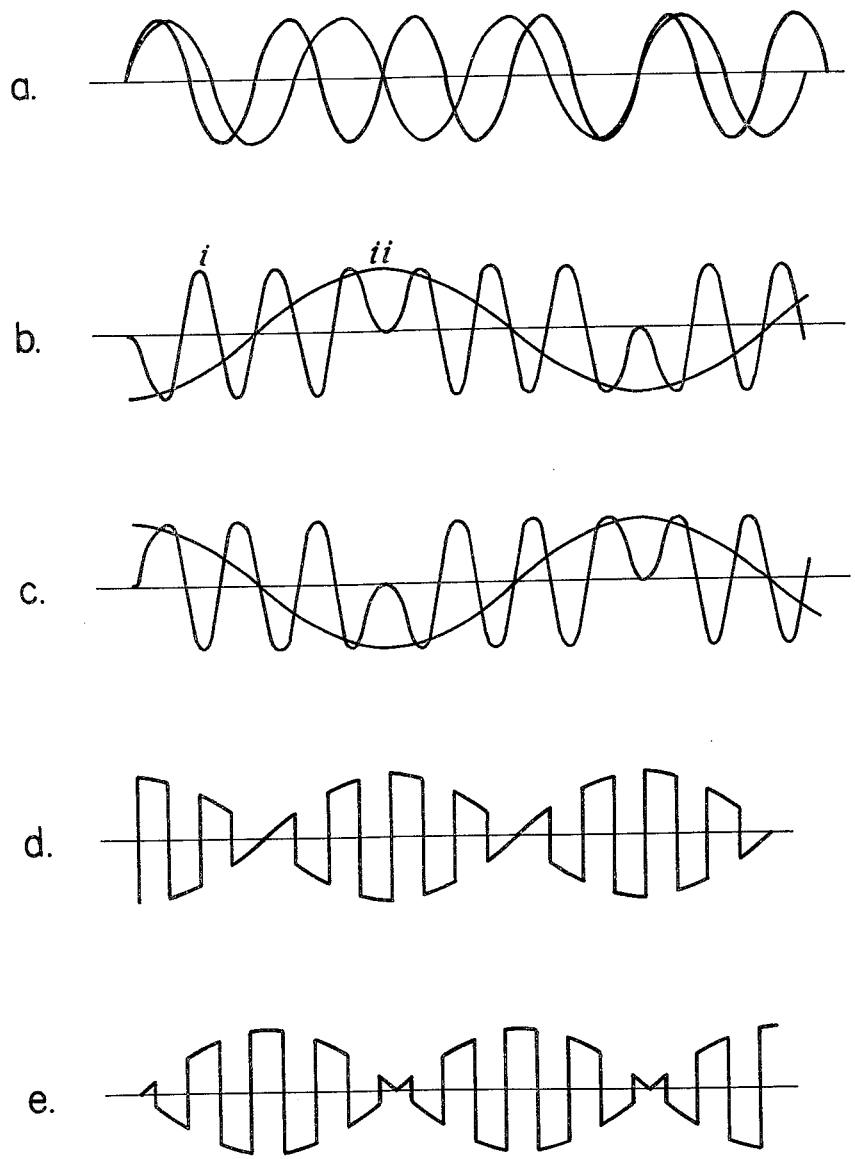
FIG. 6 is an illustration of several waveforms which are produced during the operation of the system of FIG. 1.

When the two frequencies compared in the bridge are not the same, the potential across capacitor 61 is an A.C. wave form, the frequency of which is equal to the difference frequency of the two input frequencies. Two such input frequencies in the ratio of 3 to 4 are shown in FIG. 6a, one being the input from the transducer, and the other generated in search frequency generator 5. The resulting wave form (i) at the junction of resistors 59 and 60 is shown in FIG. 6b, with the difference frequency (ii) superimposed. The "junction wave form" contains both frequencies illustrated in FIG. 6a, their harmonics, and their sum and difference frequencies. The difference frequency is invariably the lowest component of such a wave form when the two input frequencies are reasonably close, and the value of capacitance of condensor 61 is adjusted to present a low reactance to all frequencies higher than the difference frequency. For example, if the two frequencies were 25,000 c.p.s. and 25,001 c.p.s., the difference frequency would be 1 c.p.s., and the next higher frequency component in the "junction wave form" would be 25 kilocycles per second. The latter frequency and all higher frequency components are by-passed to ground, leaving only the difference frequency across the capacitor. The amplitude of this potential is proportional to the amplitude of the input frequency from the transducer, since the amplitude of the search frequency is constant.

Referring again to FIG. 3, inputs A, B, C, and D also feed to a second phase detector. This circuit is identical to the phase detector already described with the sole exception that all the diodes are reversed. The voltage drops across resistors 62 and 63 are equal to but opposite in sign from those across resistors 57 and 58, respectively. Thus the instantaneous voltage across capacitor 66, fed from the voltage divider comprising resistors 64 and 65, is equal to but opposite in sign from that across capacitor 66. Therefore, the output of the second phase detector is a true inversion of the output of the first and is shown in FIG. 6c.

Referring again to FIG. 2, the input from the transducer is fed to another bridge 4, through phase splitter 131, identical to those shown in detail in the same figure. The second input to the bridge 4 through phase splitter 131, is from the search frequency generator 5, but is 90° out of phase with that fed to the first bridge. The output of bridge 4 is fed to two phase detectors 12 and 13, shown in FIG. 3, which produce two wave forms 180° out of phase and equal in frequency to the difference frequency of the two inputs to the bridge.

Since the input to the second bridge from the search frequency generator is 90° out of phase with that fed to the first bridge, the outputs of the phase detectors will also be 90° out of phase. Likewise, when the outputs of the first bridge phase detectors are D.C. potentials (which occurs when the two input frequencies are equal and in phase or 180° out of phase), the output frequencies are equal and 90° or 270° out of phase) and visa versa.

Referring again to FIG. 3, the two inverse outputs of the phase detectors associated with the first bridge are fed to the grids of two triodes 67 and 68. These two tubes modulate the amplitude of two square waves 180° out of phase with each other, from a square wave generator. At the same time, the outputs of the other two phase detectors are fed to a similar modulator 14, which modulates two additional square waves from the square wave generator, 180° out of phase with each other and 90° out of phase with each of the square waves fed to modulator tubes 67 and 68.

The square wave generator is shown within the dashed rectangle 10, and consists of a pulse generator 69, two flip-flops 70 and 71, and four AND gates—72, 73, 74 and 75. The AND gates control the flip-flops, and are in turn controlled by the flip-flops in combination with the pulse generator 69. The AND gates 72–75 transfer control of the output back and forth between the flip-flops 70 and 71 in such a way that only one flip-flop can operate on each pulse from pulse generator 69, and flip-flops 70 and 71 each operate on alternate pulses.

For example, if it is assumed that the initial condition of both flip-flops is Off (i.e. the left half of each flip-flop is conducting), on the receipt of the first pulse from generator 69, flip-flop 70 will be flipped On via the negative pulse from pulse generator 69, through AND gate 72, primed by the negative potential from output 76 of flip-flop 71. Both AND gates 72 and 75 are primed at this time, but AND gate 75 has no effect since it delivers a negative pulse to the right half of flip-flop 71, which is already cut off. Thus, after the first pulse, flip-flop 70 is ON and flip-flop 71 is Off.

The next pulse passes through AND gate 74 which is primed with a low potential from output 77 of flip-flop 70, turning flip-flop 71 On. Thus, after the second pulse, both flip-flops 70 and 71 are On.

The third pulse passes through AND gate 73, primed from output 78 of flip-flop 71, to switch flip-flop 70 Off.

At the fourth pulse time, flip-flop 70 is Off and flip-flop 71 is On. The latter is turned Off by a pulse through AND gate 75, primed from output 79 of flip-flop 70. Both flip-flops 70 and 71 are now Off, as they were in the initial condition.

Thus after four pulses from pulse generator 69, each flip-flop is back in its original state after having produced one cycle of square wave. It is to be noted that each flip-flop has two outputs, 180° out of phase with each other, and each 90° out of phase with both outputs produced by the other flip-flop.

The two outputs 76 and 78 of flip-flop 71 are fed to the two cathodes of triodes 67 and 68 through resistors 86 and 87 via diodes 82 and 83. Diodes 80 and 81 clamp the negative going portion of each square wave to ground and the voltage drop across cathode resistors 84 and 85 determines the voltage to which the positive going portion of each square wave is clamped. The amount of current drawn through diodes 82 and 83 and cathode resistors 84 and 85 is limited by resistors 86 and 87.

The voltage on grids 88 and 89 of triodes 90 and 91 are thus at ground potential when the respective square waves from square wave generator 10 are negative, and proportional to the respective inputs to cathode followers 67 and 68 when the square waves are positive. Triodes 90 and 91 are connected in a balanced push-pull cathode follower arrangements, producing the wave form shown in FIG. 6d at output 92. This consists of a sinusoidal envelope containing the square wave generated by square wave generator 10. The frequency of the envelope is the difference frequency of the two input frequencies to the bridge.

Outputs 77 and 79 from flip-flop 70 in square wave generator 10 are fed to modulator 14 which is exactly like that discussed above, containing triodes 67, 68, 90 and 91. The inputs to modulator 14, however, are 90° out of phase with the inputs to the other modulator. The output is also 90° out of phase and is shown in FIG. 6e.

The outputs of both modulators is then fed to tuned circuit 15, which is tuned to the square wave generator frequency. The result across the tuned circuit is a sine wave of the square wave generator frequency, the amplitude of which is directly proportional to the amplitude of the input frequency from the transducer. Its amplitude may be read by voltmeter 16.

Figure 4:
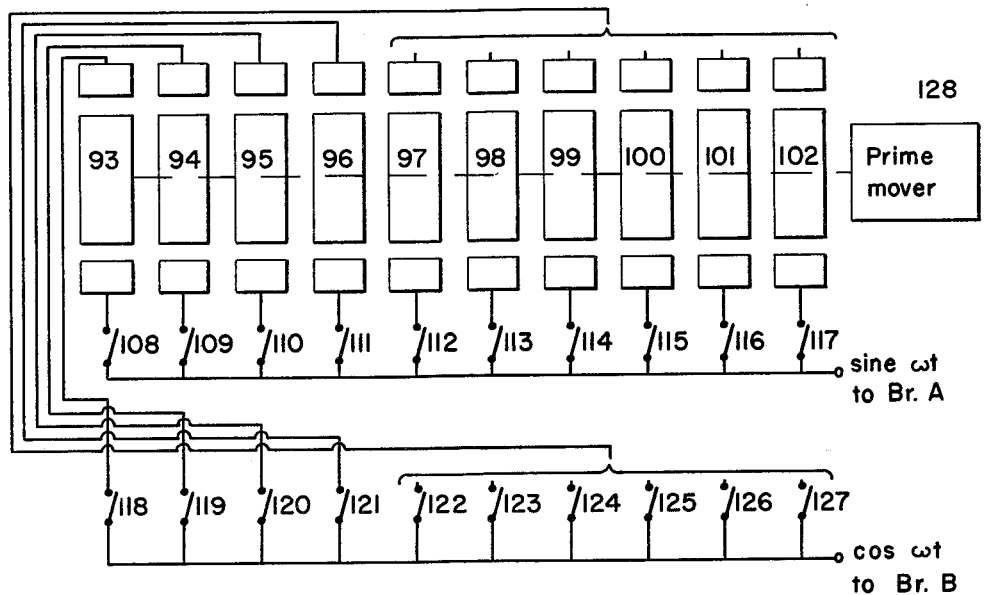
FIG. 4 is a functional block diagram, partially in schematic form of the search generator used with the system of FIG. 1.

Referring now to FIG. 4, the search frequency is generated by a series of tone wheels 93–102. Each tone wheel generates a different sine wave harmonic of a fundamental frequency in the pickup heads associated therewith, the harmonic dependent on the shape of the wheel. Each wheel is of the shape shown in FIG. 5, differing only in the number of cycles represented at the periphery. The wheel of FIG. 5 has four cycles and thus produces the fourth harmonic of the shaft rotation frequency. Two pickups 103 and 104 pick up the variations at the periphery. The pickups may be photoelectric, capacitive, magnetic, or any other method which yields a sine wave as the disc rotates. The positions of the two pickups are phased 90° apart, and the outputs are thus 90° apart in phase. Both are attached to an arm 105 which is rotatable about the axis 106 of the wheel.

The position of each pickup arm around the periphery of each wheel is adjustable by means of thumb screw 107.

Figure 5:
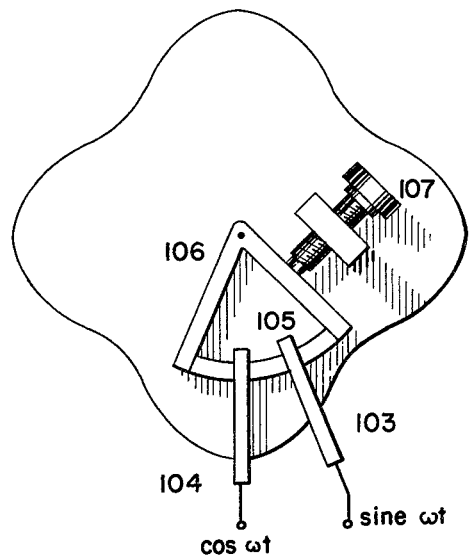
FIG. 5 is an illustration of a tone wheel used in the search generator of FIG. 4.

Each of the tone wheels in FIG. 4 is like that illustrated in FIG. 5, each having two pickups rotatable about the axis of the wheel. All the outputs from the sine pickups are connected together through a series of switches 108–117, and all the cosine outputs are connected together via switches 118–127. Varying the position of the respective pickups changes the phase of each frequency harmonic component contributed by the tone wheels to the composite sine and cosine waves. The phase of each harmonic component is varied to get as close as possible to the frequency and phase relationships of the input wave form from the transducer. In this way, the largest output is registered on voltmeter 16. Particular harmonics may be switched in or out of the composite search frequency wave forms as desired, with switches 108–127. The correct fundamental frequency is produced by controlling the angular velocity of prime mover 128.

The correct fundamental and harmonic frequencies are determined by first using the system as a wave analyzer. Only the fundamental frequency is switched in with switches 108–117, and the angular velocity of prime mover 128 slowly increased from zero to as high as desired. At the same time, the output of the system is fed into recorder 129, shown in FIGS. 1 and 3, which plots a graph of the output of tuned circuit 15 on a frequency scale. When the frequency of tone wheel 93 passes through a frequency present in the input from the transducer, tuned circuit 15 produces a voltage which is rectified in detector 130, and fed into recorder 129 to produce a pip on the graph corresponding to that frequency.

If, after a run of the system as a wave analyzer, the graph indicates that a repetitive wave form has been detected, the operator may switch in the frequencies recognized and operate the system as a passive sonar system as has been described above. Rotating the transducer and watching for the maximum reading of voltmeter 16 will then give an indication of the bearing of the detected frequency from the transducer.

The system, when used as a wave analyzer, of course is not restricted to the analysis of undersea acoustic energy, but may be employed under numerous other conditions wherever it is desired to know the frequency components of a waveform. The peculiar advantages of this however, reside in its very high selectivity and immunity from noise.

Having thus described an exemplary embodiment thereof, what I desire to claim as my invention is:

1. A wave analyzer comprising; first means for comparing the frequency components of an input wave with a predetermined frequency, second means for recognizing a signal having a frequency equal to the difference in frequency between said predetermined frequency and one of said component frequencies, third means for modulating a square wave with said difference frequency, fourth means for demodulating the output of said third means to produce a sine wave at the frequency of said square wave and of amplitude proportional to the amplitude of said input wave, and fifth means for recording a graph of the output of said fourth means relative to said predetermined frequency.

2. A wave analyzer comprising means for generating a predetermined frequency, modulator means for comparing the frequency components of an input wave with said predetermined frequency, said modulator means comprising a bridge for balancing said predetermined frequency against said component frequencies comprising: means for introducing a first signal of said predetermined frequency into first and second legs of said bridge, means for introducing a second signal of said predetermined frequency but out of phase with said first signal into third and fourth legs of said bridge, means introducing a third signal having said component frequencies into fifth and sixth legs of said bridge, means for introducing before signal having said component frequencies but out of phase with said third signal into seventh and eighth legs of said bridge, means for deriving a first positive output from the intersection of said first and fifth legs, means for deriving a first negative output from the intersection of said second and third legs, means for producing a second positive output from the intersection of said fourth and eighth legs, means for deriving a second negative output from the intersection of said sixth and seventh legs, and means combining said positive outputs and said negative outputs to produce an indication of the phase difference between said predetermined frequency and one of said component frequencies.

3. In a wave analyzer; means for comparing the frequency components of a wave to be analyzed with a variable frequency comprising; means for introducing said frequency and said components into a bridge, detector means responsive to said bridge for presenting a continuous indication of the instantaneous difference in phase between the inputs to said bridge, and means defining a band width of frequencies which may be presented by said detector means.

4. In a wave analyzer, means for comparing the frequency components of an input wave to be analyzed with a variable frequency comprising; means for introducing said variable frequency and said components into a bridge, means responsive to said bridge for presenting a continuous indication of the phase difference between said variable frequency and any component repetitive frequency within the bandpass of said bridge, adjustable means limiting the bandpass of said bridge to a predetermined number of cycles on each side of said variable frequency, and means responsive to said bridge to present an output which is indicative of the frequency and phase relationships of said components with said variable frequency.

5. A passive detection system comprising first means for generating a search signal including as components a fundamental frequency and a harmonic thereof, second means for simultaneously comparing said search signal to each of the components of an input wave, and third means for indicating a correspondence of at least one component of said search signal with at least one component of said input wave, said second means including a modulator, means for presenting said search signal and said input wave as inputs to said modulator, means deriving as an output of said modulator a continuously varying indication of the instantaneous difference in phase between at least one frequency component of said search signal and at least one repetitive component of said input wave, means for limiting the width of the bandpass of said system, means for varying the fundamental frequency of said search signal, means for varying the phase of at least one component of said search signal, and means for eliminating spurious indications due to the ringing of tuned circuits.

6. In a passive detection system, a combination comprising first means for comparing the repetitive components of two wave forms, second means responsive to a transducer to supply one of said wave forms to said first means, third means to supply the other of said wave forms to said first means, said third means including manually operable means for selecting a plurality of signals having different frequencies to make up said other wave form, means responsive to said first means for indicating that said two wave forms contain repetitive components of similar frequency, and means for selectively determining the minimum degree of similarity which can be indicated by said fourth means.

7. In a detection system, the combination comprising first and second modulators, a source of a first signal having a first frequency, a source of a second signal having a second predetermined frequency, a source of a third signal having said second predetermined frequency, said second and third signals having a predetermined phase relationship between each other, means for supplying said first signal and said second signal to said first modulator, means for supplying said second signal and said third signal to said second modulator, and output means responsive to said first and second modulators for producing an output signal indicative of the frequency and phase relationships of said first signal with said second and third signals, said output means including manually adjustable circuit means for selectively defining a band width of frequencies which may be passed by said first and second modulators, said circuit means including a plurality of reactive elements, all of said reactive elements having the same sign of reactance.

References Cited in the file of this patent

UNITED STATES PATENTS

| | | |
|---|---|---|
| 2,351,548 | Schwartz et al. | June 13, 1944 |
| 2,432,214 | Sontheimer | Dec. 9, 1947 |
| 2,452,960 | Smith | Nov. 2, 1948 |
| 2,481,659 | Guanella | Sept. 13, 1949 |
| 2,522,369 | Guanella | Sept. 12, 1950 |
| 2,526,426 | Siezen | Oct. 17, 1950 |
| 2,546,918 | Branson | Mar. 27, 1951 |
| 2,553,610 | Singleton | May 22, 1951 |
| 2,556,693 | Houghton | June 12, 1951 |
| 2,632,036 | Hurvitz | Mar. 17, 1953 |
| 2,661,419 | Tongue | Dec. 1, 1953 |
| 2,714,663 | Norton | Aug. 2, 1955 |
| 2,840,701 | Hurvitz | June 24, 1958 |
| 2,896,162 | Berger et al. | July 21, 1959 |
| 2,950,435 | Locher | Aug. 23, 1960 |
| 2,967,998 | Hurvitz | Jan. 10, 1961 |
| 2,983,870 | Wallace | May 9, 1961 |

FOREIGN PATENTS

| | | |
|---|---|---|
| 594,674 | Great Britain | Nov. 17, 1947 |
| 212,753 | Australia | Jan. 20, 1958 |

OTHER REFERENCES

"Harmonic Synthesizer for Demonstrating and Studying Complex Wave Forms" article in Journal of Scientific Instruments, October 1944; pages 174–177.

"Wide Range Double Heterodyne Spectrum Analyzers" article in Proceedings of the I.R.E., vol. 35, No. 10, October 1947; pages 1068–1073.

"The Analysis and Synthesis of Musical Sounds" article in Electronic Engineering, October 1949; pages 379–386.